United States Patent [19]
Gerlach et al.

[11] Patent Number: 5,634,199
[45] Date of Patent: May 27, 1997

[54] METHOD OF SUBSPACE BEAMFORMING USING ADAPTIVE TRANSMITTING ANTENNAS WITH FEEDBACK

[75] Inventors: Derek Gerlach, Columbus, Ohio; Arogyaswami Paulraj, Stanford; Gregory G. Raleigh, El Grananda, both of Calif.

[73] Assignee: Stanford University, Stanford, Calif.

[21] Appl. No.: 424,662

[22] Filed: Apr. 17, 1995

Related U.S. Application Data

[63] Continuation-in-part of Ser. No. 46,631, Apr. 14, 1993, Pat. No. 5,471,647.

[51] Int. Cl.$^6$ .................................................. H04B 15/00
[52] U.S. Cl. ........................... 455/63; 455/62; 455/67.3; 455/103
[58] Field of Search ............................. 455/63, 67.3, 70, 455/69, 62, 103

[56] References Cited

U.S. PATENT DOCUMENTS

| | | | |
|---|---|---|---|
| 4,495,648 | 1/1985 | Giger | 445/73 |
| 4,811,421 | 3/1989 | Havel et al. | 455/69 |
| 5,471,647 | 11/1995 | Gerlach et al. | 445/63 |

OTHER PUBLICATIONS

G. Raleigh et al., "A Blind Adaptive Transmit Antenna Algorithm for Wireless Communication," *International Communications Conference*, 1995.

Derek Gerlach et al., "Spectrum Reuse Using Transmitting Antenna Arrays with Feedback," *Proc. ICASSP*, 1994, pp. 97–100.

Derek Gerlach et al., "Adaptive Transmitting Antenna Arrays With Feedback," *IEEE Signal Processing Letters*, vol. 1, Oct., 1994, pp. 150–152.

Derek Gerlach et al., "Adaptive Transmitting Antenna Arrays With Feedback," *IEEE Transactions on Vehicular Technology*, Submitted Oct. 1994.

Derek Gerlach et al., "Adaptive Transmitting Antenna Methods for Multipath Environments," Presented at the 1994 GlobeCom Conference.

*Primary Examiner*—Edward F. Urban
*Assistant Examiner*—Darnell R. Armstrong
*Attorney, Agent, or Firm*—Lumen Intellectual Property Services

[57] ABSTRACT

A method is disclosed for using feedback to reduce crosstalk between mobile receivers in a wireless communications system comprising an adaptive transmitting antenna array. Feedback signals from the receivers are time-averaged and used to calculate a set of weight vectors that minimize crosstalk and maximize desired signal without requiring burdensome feedback rates. Beamforming diversity is combined with feedback through the use of diversity vectors. The preferred embodiment includes a method for obtaining the required feedback by exploiting the SAT circuitry present in the AMPS system currently in use. Consequently, the method may be implemented without modification to existing cellular phone handsets.

10 Claims, 5 Drawing Sheets

METHOD OF SUBSPACE BEAMFORMING USING ADAPTIVE TRANSMITTING ANTENNAS WITH FEEDBACK

This application is a continuation-in-part of Ser. No. 08/046631, now U.S. Pat. No. 5,471,647 filed Apr. 14, 1993 entitled "Method for Minimizing Cross-Talk in Adaptive Transmission Antennas."

TECHNICAL FIELD

This invention relates to methods for transmitting signals from an antenna array to multiple receivers using feedback from the receivers, with the aim of achieving high desired signal and low crosstalk at the receivers. In particular, it first relates to methods for using the subspace structure of the channel to reduce the data rate of the feedback, and second, it relates to methods for obtaining feedback information using the circuitry presently existing in the mobile unit of the Advanced Mobile Phone System (AMPS).

In cellular radio and other wireless systems, a central base transceiver simultaneously communicates with several mobile users. In such systems, an antenna array at the central base can provide two benefits. First, it can improve the quality of communication with the mobile users, and second, it can increase the number of users supportable by the system, without the allocation of additional bandwidth.

To increase quality of the communication in a wireless system, an antenna array can provide diversity to combat fading. Fading of the base-mobile link is due to destructive interference of the various multipaths in the propagation medium, and at times can cause signal attenuation by as much as 30 dB. Time and frequency diversity are traditional techniques which are highly effective in preventing signal loss. An antenna array can be used to provide beampattern diversity, which is an additional technique that supplements time and frequency diversity.

To increase capacity in a wireless system, an antenna array can implement same cell frequency reuse, which recognizes that each signal typically has a different angle of arrival at the base station. Using this technique, the base sends signals to multiple receivers on the same time/frequency channel within the same sector, and uses a separate beam to minimize crosstalk and maximize desired signal for each receiver. Such beams provide a means of reusing the resources of time and bandwidth, and they overlay with the traditional means of multiplexing such as (T/F/CDMA). Same cell frequency reuse is also sometimes known as spatial division multiple access (SDMA).

There are two aspects to using antenna arrays at the base in mobile radio: receive antenna processing (reverse link) and transmit antenna processing (forward link). In the forward link approach, there are "open loop" and "closed loop" approaches. An "open loop" approach is explored by G. Raleigh et al. in "A Blind Adaptive Transmit Antenna Algorithm for Wireless Communication," International Communications Conference, 1995. This transmit beamforming method uses the reverse link information signals sent by the mobiles as a means of determining the transmit beampatterns. This "open loop" method, however, does not provide the transmitter with feedback information about the transmitted signals, and is consequently less robust to changes in the propagation medium than feedback methods.

In contrast to the "open loop" approach, the "closed loop" approach uses an additional feedback signal from the mobiles. The transmitting array has no a priori knowledge of the location of the mobiles or the scattering bodies, and an adaptive antenna array can use a feedback signal from the mobile receivers to give the transmitter a means of gauging its beampatterns. Because of multipath, an array that simply directs a mainlobe towards a mobile may result in a fade of the desired signal or crosstalk to other mobiles. So unless the base can also account for all of the scattering bodies in the environment, undesired crosstalk or fading is liable to occur. Since adaptive transmitting antennas do not possess built-in feedback, the receivers must provide a feedback signal to enable the transmitter to function effectively in this approach.

In U.S. Pat. No. 5,471,647, "Method for Minimizing Cross-Talk in Adaptive Transmission Antennas," which is hereby incorporated by reference, Gerlach et al. present a method of multiple signal transmission using an antenna array and probing signals together with feedback from the receivers back to the transmitter. This probing-feedback method allows the transmitter to estimate the instantaneous channel vector, from which the transmitting beamformer ensures signal separation even in the face of time-varying multipath in the propagation medium. This method is further described by Gerlach et al. in the following articles which are hereby incorporated by reference: "Spectrum Reuse Using Transmitting Antenna Arrays with Feedback," *Proc. International Conference on Acoustics, Speech, and Signal Processing*, pp. 97–100, April 1994; "Adaptive Transmitting Antenna Arrays with Feedback," *IEEE Signal Processing Letters*, vol. 1, pp. 150–2, October 1994; and "Adaptive Transmitting Antenna Arrays with Feedback," *IEEE Transactions on Vehicular Technology*, submitted October 1994.

While the method of D. Gerlach et al. minimizes crosstalk and eliminates fading, it is limited by the high feedback data rates that are required to track the instantaneous channel vector. High feedback data rates are undesirable because they require a large channel capacity on a link from the receivers back to the transmitter.

If the transmitter is located in an urban environment or other cluttered area, scattering from buildings and other bodies in the propagation medium creates an interference pattern. This interference pattern contains points of constructive and destructive interference, spaced as little as one-half wavelength apart. As the receiver moves through such an environment, the channel vector can change significantly when the receiver moves as little as one-tenth of a wavelength. Consequently, the transmitter must repeatedly estimate a new channel vector by sending probing signals and receiving feedback. The feedback rate needed is 19,200 bps for a receiver moving 30 mph receiving a 900 MHz carrier using a six element array with four bit accuracy. The need for such high feedback rates renders antenna arrays impractical for most applications.

In addition to high feedback rates, the method of D. Gerlach et al. can be difficult to implement because the air interface standard would have to be changed to add in the feedback feature. The users would have to exchange their old handsets for new ones that are compatible with the new feedback standard. This is a costly and impractical modification.

SUMMARY OF THE INVENTION

In view of the above, it is the primary object of this invention to provide a practical, inexpensive and robust method for reducing crosstalk in adaptive transmission antenna systems. In particular, it is an object of the invention to minimize crosstalk in such systems by reducing the required feedback rates, and by obtaining the feedback through use of the circuitry already existing in mobile handsets.

To reduce the feedback rates, we disclose adaptive transmitting antenna methods that are based on an autocorrelation matrix associated with each receiver, rather than the receiver's instantaneous channel vector. In contrast to the instantaneous channel vector, which can change violently with receiver movement and requires significant feedback rates to track, the autocorrelation matrix, which describes the time-averaged behavior of the channel vector, requires far less feedback to track.

To estimate the correlation matrix, the probing/feedback method of D. Gerlach et al. is used to estimate the channel vector for each receiver at several time instants. The correlation matrix estimate is then formed by averaging outer products of these channel vectors. Once the correlation matrix for each receiver is obtained from feedback, it can be used as the basis for several beamforming methods.

To mitigate fading of the desired signal at the receivers, a new diversity beamforming method is used to determine the beamforming weights (i.e., the information weight vector) for each information signal. In this method, a set of diversity weight vectors are created, each of which has significant projection onto the receiver's correlation matrix and produces an independent fading pattern. Feedback from the receiver is then used to identify parameters of the channel vector. These parameters are used to form the information weight vector by optimally combining the set of diversity vectors by any of the well-known diversity combing methods, such as maximum ratio or equal gain combining. The advantage of this approach to insuring adequate desired signal level is that feedback is used to obtain a parameter of the instantaneous channel vector, rather than the complete channel. Hence, lower feedback rates can insure adequate desired signal level.

In contrast to methods that combine antenna diversity with feedback, e.g., W. C. Jakes, *Mobile Microwave Communications*, New York, John Wiley, 1974, the method of this invention uses the diversity weight vectors to combine beam diversity with feedback. In particular, the diversity vectors are calculated to maximize the time-average signal at each receiver, i.e., to have high projection onto its channel matrix.

When other receivers are on the same frequency channel, the above method is adapted to achieve low crosstalk at the undesired receivers as well as high signal power at the desired receiver. The information weight vector is calculated to have low projection and high projection onto the channel matrices corresponding to unintended and intended receivers, respectively. Physically, this corresponds to placing low beampattern gain on the undesired receivers and all scatterers which couple to them.

In a preferred embodiment, the method involves using the mobile handset circuitry already existing in the Advanced Mobile Phone Systems (AMPS) to obtain the required feedback information. By exploiting existing circuitry used to process the supervisory audio tone (SAT), the implementation of this method does not require the modification or replacement of the millions of handsets already owned by consumers. In the current system, the SAT is used to insure that each mobile is talking to the correct base and vice versa. By injecting a second reference signal with certain modulation properties, the base is able to measure the relative received signal strength at the mobile. This signal strength estimate constitutes feedback, and can be used for both channel estimation and diversity combining. This method is suitable for beamforming using either the channel vector, or using the correlation matrix itself.

DETAILED DESCRIPTION

For the purpose of this discussion, the goal of an adaptive transmit antenna array is to send multiple signals from an antenna array through a propagation environment to several receivers, so that each receiver gets adequate desired signal with minimum crosstalk.

Figure 1:
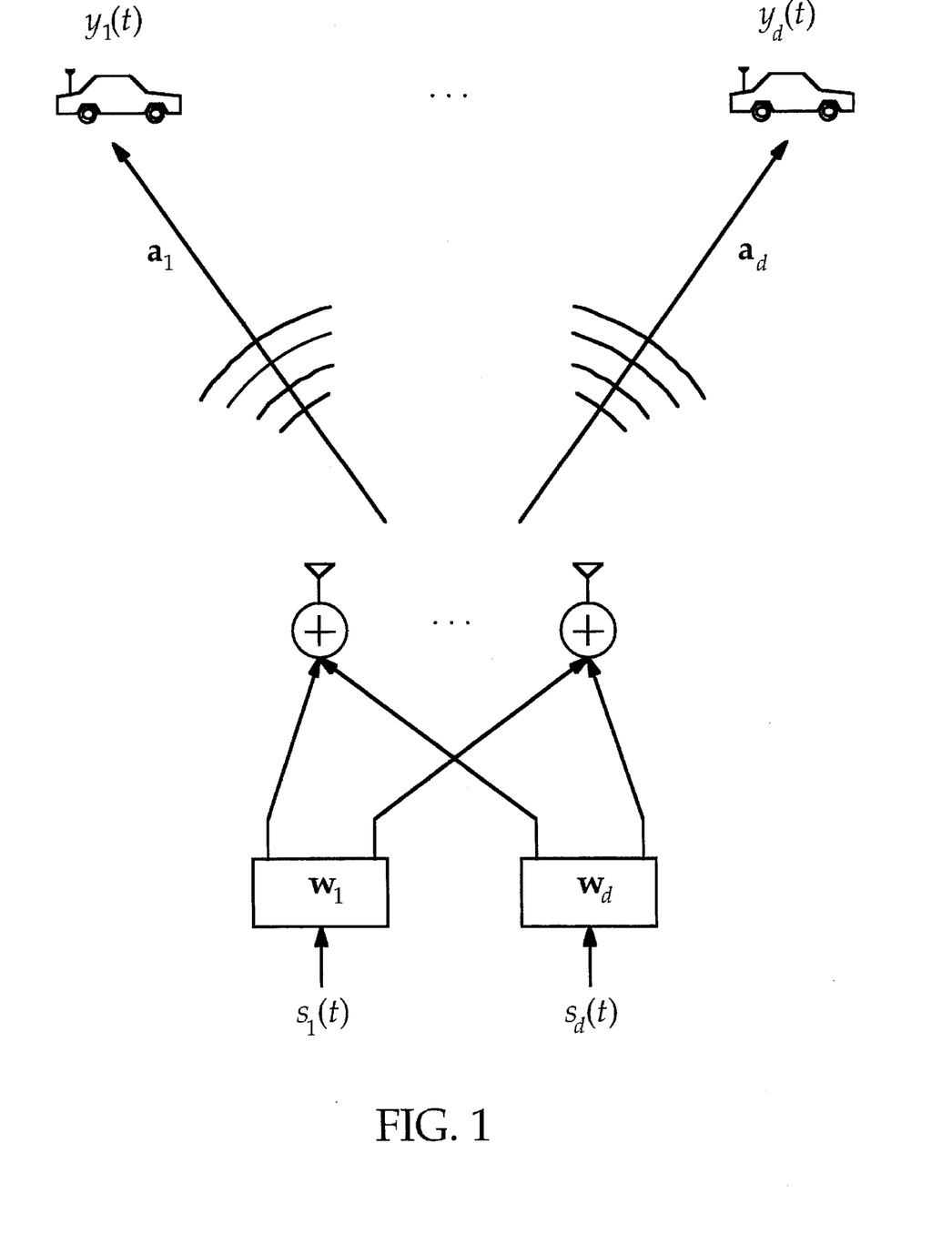
FIG. 1 is a diagram of a transmitting antenna array sending multiple signals through a propagation medium to several receivers in accordance with the prior art.

Let $$s_1(t), \ldots, s_d(t) \qquad (1)$$

be the d information bearing signals sent by the array intended for d remote receivers, as shown in FIG. 1.

Let the antenna array consist of m transmitting elements, and let the complex vector channel (also known as the channel vector, instantaneous channel vector, array response vector, or the spatial signature) from the array to the $k^{th}$ receiver be given by $$a_k = \begin{pmatrix} a_{1k} \\ \cdot \\ \cdot \\ \cdot \\ a_{mk} \end{pmatrix}, \qquad (2)$$

where $a_{ik}$ is the complex channel response from the $i^{th}$ element to the $k^{th}$ receiver. The channel vector $a_k$ represents the total channel including the transmitter electronics, antenna array, and reflections within the propagation medium, and varies with time due to mobile receiver motion.

Unless we are explicitly discussing time dependence, we will use $a_k$ instead of $a_k(t)$. In order to ensure that the channel is adequately described by a single vector, we need the following condition:

$$\delta_{mp} \ll BW^{-1}, \qquad (3)$$

where $\delta_{mp}$ is the maximum differential delay due to multipath in the propagation medium, and BW is the information signal bandwidth (same for all information signals). This narrowband condition is present in AMPS as well as IS-54, which have a 28 kHz nominal bandwidth. Digital systems which meet (3) will not suffer from significant intersymbol interference.

In order to transmit the d signals to the receivers, let $v_j$ be the beamforming weight vector for the $j^{th}$ information signal. For notational convenience, define $w_j = v_j^*$, where * denotes complex conjugation, and refer to the $w_j$ as weight vectors as well. If we consider the array output due to only the $j^{th}$ signal $s_j(t)$ with its corresponding weight vector $w_j$, then the signal received at the $k^{th}$ receiver will be $$w_j^H a_k s_j(t), \qquad (4)$$

where $w_j^H$ denotes the Hermitian conjugate of $w_j$. Let $$c_{jk} = w_j^H a_k. \qquad (5)$$

For $j=k$, $c_{jk}$ is the desired signal amplitude, and for $j \neq k$, $c_{jk}$ is the crosstalk signal amplitude at the $k^{th}$ receiver due to the $j^{th}$ signal. Let $$y_1(t), \ldots, y_d(t) \qquad (6)$$

be the responses at the remote receivers due to the transmitted information signals. Then $y_k(t)$ is given by the superposition of the responses due to each $s_j(t)$:

$$y_k(t) = \sum_{j=1}^{d} c_{jk} s_j(t). \qquad (7)$$

D. Gerlach et al. teach a beamforming method that ideally achieves $$y_k(t) = s_k(t).$$

This was accomplished by calculating the weight vectors so that, ideally, $$w_j^H a_k = 0 \text{ for } k \neq j \qquad (9)$$

and $$w_j^H a_k = 1 \text{ for } k = j. \qquad (10)$$

As stated before, this method requires continuous tracking of the instantaneous channel vectors via probing and feedback, and for rapidly moving mobiles, this implies a burdensome feedback channel. Moreover, it is not obvious how to deliver feedback information to the base without modifying or replacing the existing mobile handsets.

A method of beampattern diversity is now disclosed that provides adequate desired signal level at each receiver. Focus for the moment on one receiver and the one information signal transmitted to it, and suppress the corresponding subscripts k and j. Let $$e_1, \ldots, e_n \qquad (11)$$

denote a set of n unit-norm m-dimensional diversity vectors. If used to transmit an information signal, the $g^{th}$ diversity vector will induce a received signal amplitude of $$e_g^H a. \qquad (12)$$

By combining the diversity vectors appropriately to form the information weight vector, diversity gain can be realized.

Generally, each diversity vector should induce a high time-average signal power, and produce mutually uncorrelated fading. The choice of diversity vectors is critical, and the way in which they are calculated is an important novel feature of this invention. Methods of calculating them will be deferred for the moment.

Once the diversity vectors are calculated, probing and feedback are used by the transmitter to measure a property of the instantaneous channel vector. This property is used to form the information weight vector by combining the diversity vectors, so that the instantaneous desired signal amplitude in Eq.(5) is a maximum. There are several different combining methods including maximum ratio, equal gain, selection, and scanning. Others are described by Jakes. Define E to be the matrix whose columns are $e_1, \ldots, e_n$:

$$E = [e_1 \ldots e_n]. \qquad (13)$$

In all combining methods, the transmitter seeks a unit-norm n-dimensional combining vector, u, such that the weight vector given by $$w = Eu \qquad (14)$$

maximizes the desired signal power:

$$\|w^H a\|^2 = \|u^H a_e\|^2, \qquad (15)$$

where $$a_e = E^H a \qquad (16)$$

is the projection of the channel vector onto the subspace spanned by the columns of E. For each different combining method, a different constraint is placed on combining vector u, and a different set of channel parameters is acquired using feedback. The advantage of this diversity approach to achieving desired signal maximization is that only certain parameters of the instantaneous channel vector within a certain subspace (matrix) are needed, rather than the entire channel vector. Therefore, less feedback is needed.

There are several combining methods which can be used to form the information weight vector. Regardless of the combining method, the information weight vector is calculated according to Eq.(14). If needed, the information weight vector length can then be scaled to provide the necessary gross radiated power from the array.

For example, in equal gain combining, each element of u must be modulus $1/\sqrt{n}$. The u which optimizes Eq.(15) is $$u = a_e ./ (\sqrt{n} |a_e|) \qquad (17)$$

where ./ denotes element-wise division, and $|a_e|$ denotes element-wise absolute value. The parameters of the channel vector acquired via feedback are the relative phases of the entries of $a_e$. These phases can be acquired by using the exact same probing method disclosed by D. Gerlach et al. except that the probing vectors transmitted by the array are the now the diversity vectors (13) or any unitary transformation thereof. In addition, the receivers only measure the phases of the probing signal responses, and feed back these phases referenced to the first probing signal phase.

In maximum ratio combining, there is no constraint on the combining vector u, other than it must be unit norm. The probing of the channel proceeds exactly as in the method disclosed by D. Gerlach et al. except that the probing vectors transmitted by the array are equal to the diversity vectors (13) or any unitary transformation thereof. The combining vector which optimizes Eq.(15) is given by $$u = \frac{a_e}{\|a_e\|}. \qquad (18)$$

In selection combining, the combining vector must have all components equal to zero, except one component which takes value one. Selection combining is very attractive because the information signals themselves can play the role of the probing signals. The transmitter uses one of the diversity vectors to transmit the information signals. Periodically, the transmitter enters a probing mode in which each diversity vector (13) is used in turn to send the information signals. The receiver measures the power it receives for each diversity vector, and sends back a word specifying which diversity vector induced the largest received power. The transmitter then resumes normal information signal transmission using the diversity vector with largest received power. The optimum combining vector in this case has all entries equal to zero except one entry which assumes the value of unity in the position corresponding to the strongest diversity vector.

A primitive selection combining method with feedback is presented by Jakes. In that approach, each diversity vector is chosen to excite only one antenna. In terms of the above discussion, that means $e_g$ has zeros in all components except the $g^{th}$ component, which has value one. In contrast, the approach of this invention uses beam diversity vectors to drive the entire phased array in accordance with information derived from feedback.

In addition to the use of beam diversity with feedback, this invention also provides a novel way in which the diversity vectors are calculated. To understand this, we must first define the channel correlation matrix. Let the correlation matrix for the channel be $$R = \frac{1}{L} \sum_{l=1}^{L} a(l\Delta t) a(l\Delta t)^H. \tag{19}$$

If there are multiple mobiles, there will be a set of correlation matrices, $R_1, \ldots, R_d$, one for each mobile. The correlation matrix describes, in a time-average sense, the behavior of the channel. As the channel vector varies due to receiver motion, the vector will point on average in certain directions, which are revealed in an eigendecomposition of (19). In simple scattering environments, the channel vector's variations will be well-confined to a subspace, while in more complicated situations, the vector may exhibit only approximate subspace confinement. The subspace is the set of directions in which the channel vector tends to point. This subspace is dependent only on the mobile receiver's gross position, and is much more stable than the channel vector. The method of this invention deals with beamforming methods based on the more stable subspace structure implicit in (19). One convenient why to collect the channel vectors in (19) is through the probing-feedback method disclosed by D. Gerlach et al. The estimate in (19) can be made with arbitrary time interval between each term, and with a weighting of each term to de-emphasize old channel vectors.

This correlation matrix can be used to calculate the diversity vectors. Consider only one receiver again, and we suppress the subscript k.

Consider the crosscorrelation between the signal amplitude induced at the receiver by the $g^{th}$ and $h^{th}$ diversity vectors:

$$b_{gh} = \frac{1}{L} \sum_{l=1}^{L} [e_g^H a(l\Delta t)][e_h^H a(l\Delta t)]^H \tag{20}$$

$$= e_g^H \left[ \frac{1}{L} \sum_{l=1}^{L} a(l\Delta t) a(l\Delta t)^H \right] e_h \tag{21}$$

$$= e_g^H R e_h. \tag{22}$$

If $g=h$, $b_{gg}$ is the average power delivered to the receiver; if $g \neq h$, $b_{gh}$ is the cross correlation between the signal amplitudes of the $g^{th}$ and the $h^{th}$ diversity vectors. Therefore, a description of the time-average correlation properties inherently involves the subspace structure of matrix R.

For optimum diversity gain, the diversity vectors should have low cross-correlation (independent fading), and high average delivered power. In most cases, $n \leq m$, and these two conditions can be simultaneously fulfilled by letting $e_1, \ldots, e_n$ be the n eigenvectors of R corresponding to the n largest eigenvalues. If $n \geq m$, then linear combinations of the eigenvectors can be used; however, the cross-correlation may be high in this case.

This method is applicable even if only one diversity vector is used (n=1). In this case, no diversity combining is needed, and $$w = e_1. \tag{23}$$

The diversity vector should be chosen to be $$e_1 = \arg\max_{e_1} e_1^H R e_1 \text{ with } \|e_1\| = 1. \tag{24}$$

The solution to Eq.(24) is the eigenvector of R corresponding to the largest eigenvalue, and delivers, on average, the highest power to the receiver.

In the n=1 case, it is not necessary to estimate the matrix R explicitly in order to obtain its dominant eigenvector. If, through feedback, the base was able to obtain $J(w) = w^H R w$, then it could optimize $J(w)$ using the linear random search (LRS) or differential steepest descent (DSD) algorithm presented by B. Widrow et al., "A Comparison of Adaptive Algorithms Based on the Methods of Steepest Descent and Random Search," *IEEE Trans. on Antennas and Propagations*, vol. AP-24, pp. 615–37, Sept. 1976. In its simplest form, the DSD algorithm has three steps. First, the base perturbs the weight vector in various directions while maintaining unity norm of w, and measures $J(w)$ for each perturbation. Second, using standard methods, the local gradient of $J(w)$ with respect to w is constructed from the perturbations. Third, knowing the gradient, the base can then increment w in the direction of the negative gradient of $J(w)$. These three steps are repeatedly carried out until $J(w)$ is minimized. This assumes that $J(w)$ is available to the base. We will defer discussion of methods obtaining $J(w)$ until later.

If there are multiple receivers, then an additional condition must be imposed on the diversity vectors to minimize crosstalk. As before, each signal must arrive with adequate strength at its intended receiver. The new condition is that each signal must arrive with minimum amplitude at receivers for which it is not intended. This condition can be incorporated into all of the above methods by choosing the diversity vectors Eq.(13) according to a new criterion which accounts for crosstalk. As before, let $$e_1^j, \ldots, e_n^j \tag{25}$$

denote the set of n unit-norm diversity vectors used to transmit the $j^{th}$ signal. As before, the set of $e^j$ should have small cross-correlation and large auto-correlation by minimizing and maximizing $b_{gh}$ for $g \neq h$ and $g = h$, respectively. In addition to these two requirements, the new requirement is that the crosstalk power induced by the $g^{th}$ diversity vector at the $k^{th}$ receiver should be small for $j \neq k$ and for all g, i.e., $$e_g^{jH} R_k e_g^j = 0 \text{ for } j \neq k. \tag{26}$$

These three conditions are simultaneously met by letting $e_1^j, \ldots, e_n^j$ be the n generalized eigenvectors of the pair $(R_j, Q_j)$ corresponding to the n largest eigenvalues, where $Q_j =$ $$\sum_{k \neq j} R_k.$$

In computing the matrix $Q_j$, it is sometimes necessary to scale each term so that each term contributes equally. One possible scaling is by the trace of each term, in which case we have $$Q_j = \sum_{k \neq j} \frac{1}{tr(R_k)} R_k. \tag{27}$$

Other more sophisticated methods of optimizing the diversity vectors are presented in D. Gerlach et al., "Base Station Stransmitting Antenna Arrays for Multipath Environments," *Signal Processing*, 1995, Submitted January 1995. Except for this new criterion for choosing the diversity vectors, all of the above methods proceed as before.

Although the above method of estimating the correlation matrix uses snapshots of the instantaneous channel vector, other methods can be used as well. For example, the average power received at a receiver due to weight vector $w$ is $p = w^H R w = x^T r$, where $x = \text{vec}(w \, w^H)$ and $r = \text{vec}(R)$. By measuring and feeding back p for J values of x, the base can set up a system of equations for r. Let $p = [p_1 \ldots p_J]^T$ and $X = [x_1 \ldots x_J]^T$. Then $X^T r = p$. Knowing r, then R in turn is given by $R = \text{unvec}(r)$.

To provide feedback signals, the mobile handsets would normally have to be modified or replaced. To obviate the need for this change, we disclose a method of using the SAT circuitry present in the AMPS system to obtain feedback. Focus for the moment on one mobile. Let $s(t)$ be the information signal launched by the base to the mobile, and let w be its corresponding weight vector. The operation of this invention relies on transmitting a secondary reference signal $\bar{s}(t)$ to the same mobile by means of a secondary reference weight vector, $\bar{w}$. As before, let a denote the forward link vector channel. The interaction of the information signal and the reference signal are such that the base is able to measure the quantity $$\rho = \left\lVert \frac{\bar{w}^H a}{w^H a} \right\rVert. \tag{28}$$

The method presented below enables the base to measure the quantity $\rho$ without modification of the mobile handsets. Before we delve into this method by which $\rho$ can be measured, let us consider how the base could use $\rho$, if it were available.

One way in which the base could use $\rho$ is through selection combining. As described earlier, selection diversity combining uses feedback to pick one of several diversity vectors as the information weight vector. If there are two diversity vectors (n=2), then for selection combining the base needs feedback to identify which of the two vectors produces the largest response at the mobile. If the base sets $\bar{w} = e_1$ and $w = e_2$, then the base can use the method presented below to measure $$\rho = \left\lVert \frac{e_1^H a}{e_2^H a} \right\rVert \tag{29}$$

and determine which diversity vector gives larger response at the mobile. If n>2, the base could make repeated comparisons of the response strengths of the diversity vectors by repeatedly measuring $\rho$ using different pairs of diversity vectors. Through several comparisons of diversity vectors, the diversity vector of largest response could be identified. Once identified, the base uses this diversity vector as the information weight vector.

Another way in which the base could use $\rho$ is through maximum ratio combining. In maximum ratio combining, the base must find a unit-norm combining vector u which maximizes the delivered power:

$$u = \arg \max_u \lVert w^H a \rVert^2 \tag{30}$$

$$= \arg \max_u \left\lVert \frac{w^H a}{\bar{w}^H a} \right\rVert^2 \tag{31}$$

$$= \arg \min_u \rho, \tag{32}$$

where $w = Eu$. In this implementation, the reference weight vector $\bar{w}$ is fixed, and is chosen so that it minimizes interference to other mobiles. This minimization of Eq.(32) can be carried out using the above mentioned DSD algorithm or the LRS algorithm presented by Widrow.

As described in the previous section, the solution to the maximum ratio problem of Eq.(32) is $$u = \frac{a_e}{\lVert a_e \rVert}. \tag{33}$$

Therefore, this method can be used to identify a on the subspace spanned by the diversity vectors. If there is more than one mobile present, this channel estimate can be used to reduce crosstalk using the method of D. Gerlach et al.

If n=1, no diversity combining is needed, and then knowledge of $\rho$ can be used to find the weight vector w. In the previous section, we presented such a method, but it required knowledge of J(w). Note, however, that $$J(w) = w^H R w \tag{34}$$

$$= \frac{1}{L} \sum_{l=1}^{L} \lVert w^H a(l \Delta t) \rVert^2 \tag{35}$$

$$\propto \sum_{l=1}^{L} \rho(l \Delta t)^{-2}. \tag{36}$$

By repeatedly measuring $\rho$, an estimate of J(w) can be obtained within a proportionality constant. For the purposes of the LRS and DSD iterative optimization methods described in the previous section, knowing J(w) to within a scale constant is sufficient.

Figure 2:
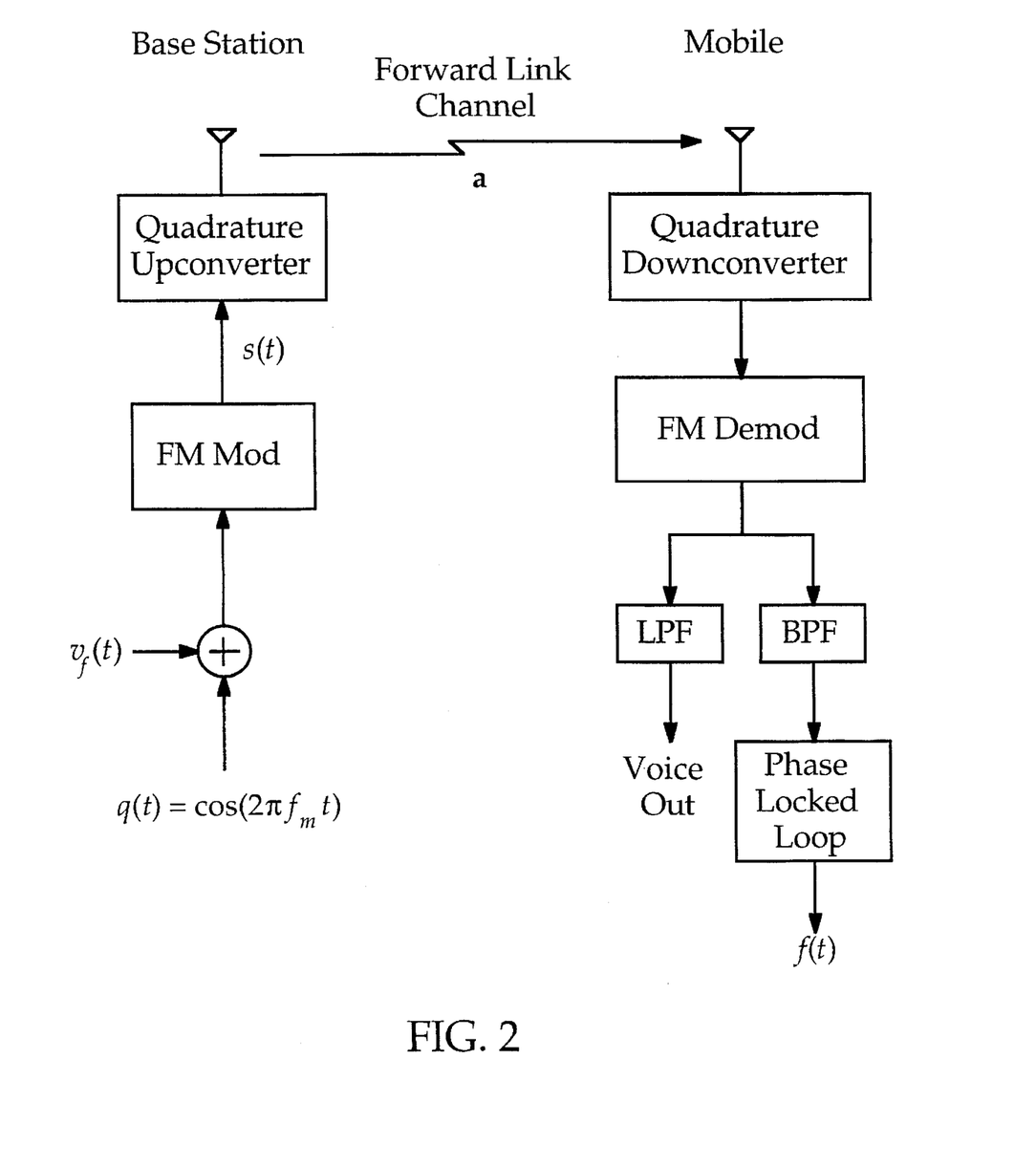
FIG. 2 shows the forward link of the AMPS system used in the current art, indicating the path of the SAT tone. The mobile estimates the SAT frequency using a phase-locked loop.

We now disclose the method for using the existing circuitry in the AMPS handset to measure $\rho$. First consider the forward link of AMPS system, shown in FIG. 2. Let $v_f(t)$ denote the voice signal to be transmitted on the forward link. This voice signal is bandlimited to 3 kHz. Also shown in FIG. 2 is the Supervisory Audio Tone (SAT), which is used to insure continuity of the forward and reverse links. Let $$q(t) = \cos(2\pi f_m t) \tag{37}$$

denote the SAT tone, which, in the current system, has a frequency of either $f_m = 5970$ Hz, $f_m = 6000$ Hz, or $f_m = 6030$ Hz. The sum $v_f(t) + q(t)$ is frequency modulated, resulting in s(t) (baseband analytic signal) which occupies a nominal bandwidth of 28 kHz:

$$s(t) = \exp \left[ j\gamma \int_0^t v_f(\alpha) + q(\alpha) d(\alpha) \right]. \tag{38}$$

Quantity $\gamma$ is a scaling factor which determines the modulation index and bandwidth of s(t). In the current system, one antenna is used, and the channel is characterized by complex scalar $\alpha$ (Eq.(2) with m=1). The FM signal s(t) is transmitted through the channel, and the mobile receives the FM signal $$a\, s(t) \tag{39}$$

and demodulates it. The voice and SAT tone components are separated using lowpass and bandpass filters. The mobile then estimates the instantaneous frequency, $f(t)$, of the SAT tone by means of a phase locked loop. Normally, this instantaneous frequency is given by $$f(t)=f_m. \tag{40}$$

During call setup and initiation, the base tells the mobile which of the three SAT frequencies it will use. If, during the conversation, the mobile's estimate of the SAT frequency does not match the pre-agreed SAT frequency, the mobile drops the call. In this way, the SAT frequency is used to check that the mobile receives its signal from the correct base station.

Figure 3:
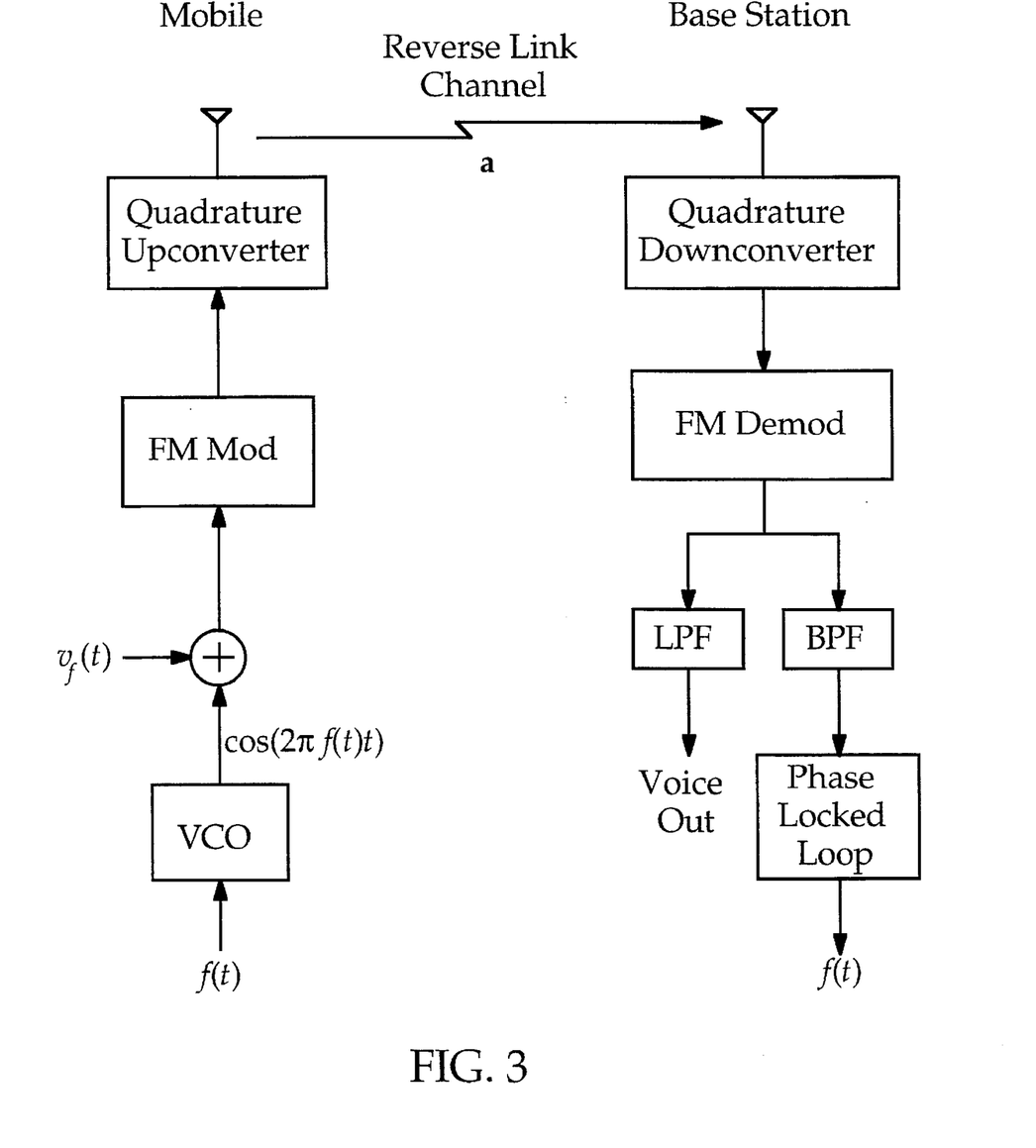
FIG. 3 shows the reverse link of the AMPS system used in the current art. The mobile uses the detected instantaneous frequency to modulate the phase locked loop.

To insure continuity of the reverse link, a similar operation is performed. FIG. 3 shows the reverse link of the current system. As before, the voice signal to be sent to the base is $v_r(t)$. Instead of simply creating a SAT tone of the agreed upon frequency, the mobile instead uses a voltage controlled oscillator (VCO) to create a signal of constant modulus, but with instantaneous frequency equal to that obtained from its phase locked loop. This signal is given by $$\cos(2\pi f(t)t). \tag{41}$$

The voice signal and regenerated SAT are summed, frequency modulated, and sent back to the base in a manner analogous to the forward link of FIG. 2. The base then checks the frequency of the SAT received from the mobile and compares it with the agreed upon value. If they differ, the base drops the call, thereby insuring that the base is receiving its signal from the correct mobile.

Figure 4:
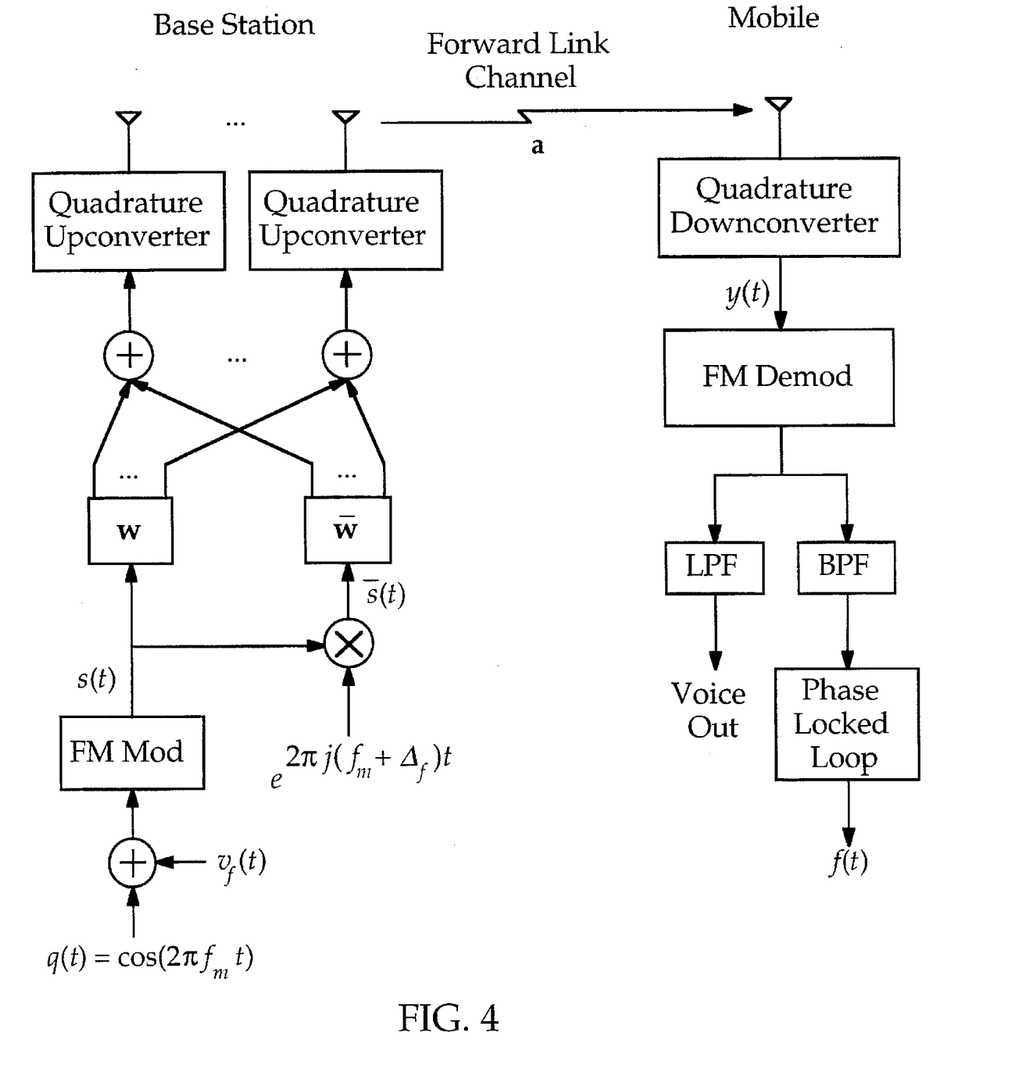
FIG. 4 shows the forward link of the communications system in accordance with the preferred embodiment of the invention. Two signals are launched from the base according to two different weight vectors.

Because the mobile remodulates its SAT with the instantaneous frequency $f(t)$, the base is also able to obtain the instantaneous frequency, and therein lies the possibility of feedback. FIG. 4 shows the forward link of the proposed method, which uses an antenna array. The basic idea of the invention is to send two signals according to two different weight vectors. When the two signals are received at the mobile, they cause a fluctuation in the instantaneous frequency of the received SAT tone. The excursions of the instantaneous frequency are dependent on the relative amplitude of one signal with respect to the other. The mobile sends the instantaneous frequency back to the base, enabling the base to measure the frequency excursions, and thereby the relative amplitude, which we will see is related to $\rho$. Note that the differences between the proposed method in FIG. 4 and the current system shown in FIG. 2 occur only in the base unit, not the mobile unit. The mobile unit requires no modification.

In the proposed method, the voice signal and SAT tone are first summed and modulated as before in Eq.(38) to produce $s(t)$. Signal $s(t)$ is launched according to weight vector w. In addition, a second reference signal is launched according to a reference weight vector $\bar{w}$. One choice for this reference signal is $$\bar{s}(t)=s(t)e^{2\pi j(f_m+\Delta_f)t}. \tag{42}$$

The total signal received at the mobile has a component due to the first signal and the reference signal:

$$y(t)=w^H as(t)+\bar{w}^H as(t)e^{2\pi j(f_m+\Delta_f)t}. \tag{43}$$

If we let $$\rho e^{j\phi}=\frac{\bar{w}^H a}{w^H a}, \tag{44}$$

the received signal can be written as $$y(t)=w^H as(t)[1+\rho e^{j\phi}e^{2\pi j(f_m+\Delta_f)t}]. \tag{45}$$

It can be shown, e.g., as in F. G. Stremler, *Introduction to Communication Systems*, Addison-Wesley, 1982, that when $y(t)$ is demodulated by the mobile, the resulting waveform contains a voice and a SAT component:

$$w(t)=v_f(t)+q_{tot}(t), \tag{46}$$

where $$q_{tot}(t)=\cos(2\pi f_m t)+\alpha(\rho)\cos(2\pi(f_m+\Delta_f)t). \tag{47}$$

Quantity $\rho$ is the real and positive pre-demodulation received signal amplitude ratio of $s(t)$ and $\bar{s}(t)$. By contrast, scalar $\alpha(\rho)$ is the real and positive post-demodulation received signal amplitude ratio of the corresponding two peaks at $f_m$ and $f_m+\Delta_f$. It is a monotonic increasing function of $\rho$, as will be discussed below.

Eq.(47) shows that $q_{tot}(t)$ is composed of two components, which cause a beating phenomenon of the instantaneous frequency of $q_{tot}(t)$. In the current system, there is no beating phenomenon because the base sends only signal $s(t)$. Assuming the frequency shift of $\bar{s}(t)$ is small, i.e., $$\Delta_f \ll f_m, \tag{48}$$

we may rewrite the SAT component $q_{tot}(t)$ as a single cosine, with a time-varying instantaneous frequency and amplitude:

$$q_{tot}(t)=A(t)\cos(2\pi f(t)t), \tag{49}$$

where $$f(t)=f_m+\frac{\Delta_f}{\frac{1+\alpha\cos(\phi+t\Delta_f)}{\alpha(\alpha+\cos(\phi+t\Delta_f))}+1} \tag{50}$$

and $$A(t)=\cos(2\pi f_m t)+\alpha\cos(2\pi(f_m+\Delta_f)t). \tag{51}$$

Waveform $q_{tot}(t)$ is applied to the phase locked loop, which outputs the instantaneous frequency Eq.(50). As is specified by the AMPS standard, the mobile uses this instantaneous frequency to remodulate the SAT, and it is sent back to the base. By demodulating the reverse SAT, the base has knowledge of Eq.(50), as in the current system shown in FIG. 3.

By observing $f(t)$, the base is able to back out the information pertaining to $\alpha$. If $\alpha \leq 1$, $f(t)$ oscillates between the extremes $$f_{max}=f_m+\frac{\alpha\Delta_f}{\alpha+1} \tag{52}$$

and $$f_{min}=f_m-\frac{\alpha\Delta_f}{\alpha-1} \tag{53}$$

By observing the extreme values of $f(t)$, the base can solve either Eq.(52) or Eq.(53) for $\alpha$.

Figure 5:
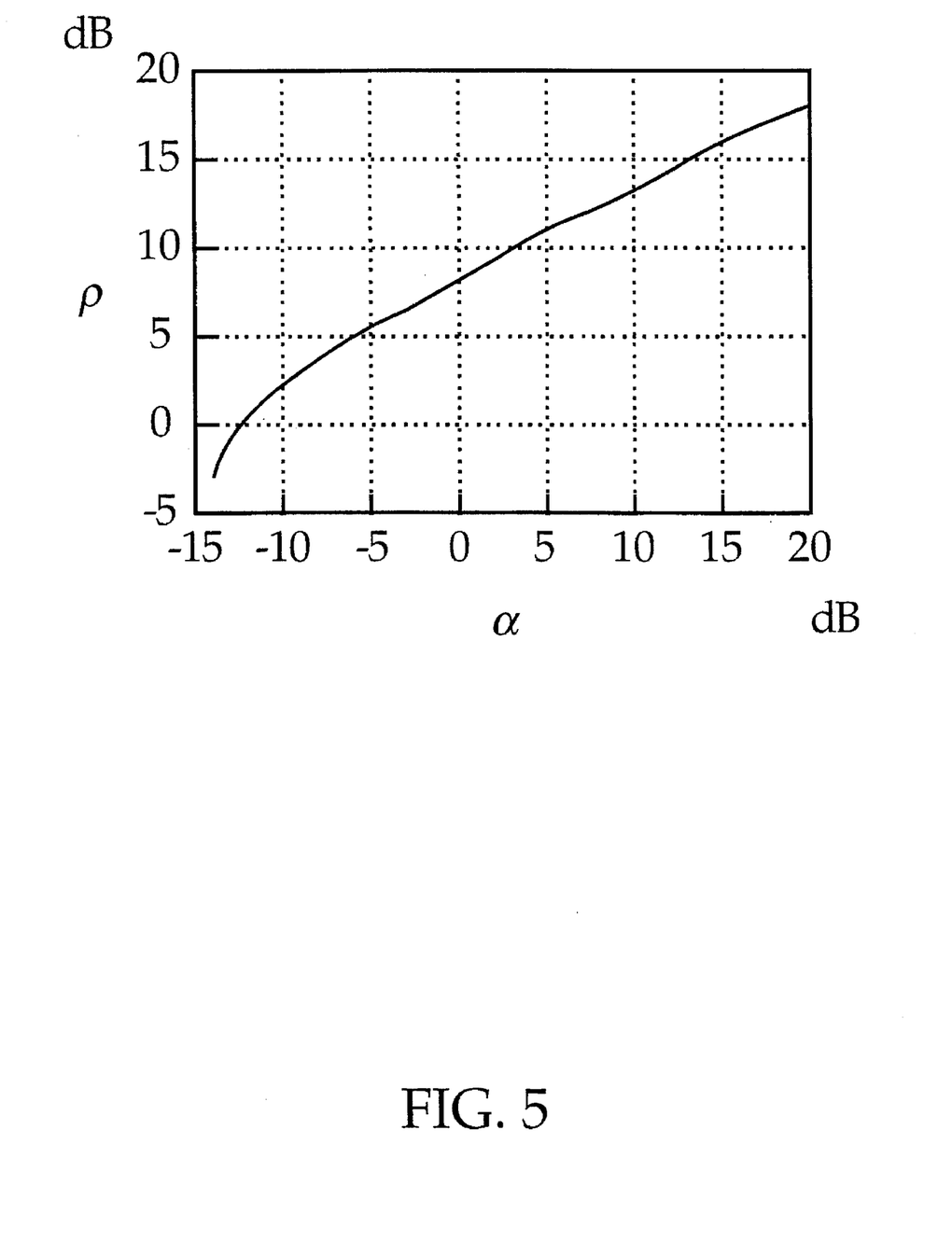
FIG. 5 shows the relationship between post-demodulation SAT amplitude ratio $\alpha$, and the pre-demodulation channel gains, $\rho$, in accordance with the invention.

The quantity of primary interest, however, is $\rho$, so we now return to the relationship between $\rho$ and $\alpha$. Quantity $\rho$ is in theory determined by an addition of several Bessel functions. We will not delve into this calculation, but simply present the relationship between the two in FIG. 5, which was obtained by computer simulation of the frequency modulation and demodulation process. The conversion table embodied in FIG. 5 could be stored in a look-up table, enabling the base to determine ρ from α. The basic operation of the invention which uses the circuitry in the AMPS mobile for feedback proceeds as follows:

1. The base transmits signal s and reference signal $\bar{s}$ according to weight vectors w and $\bar{w}$.
2. The signal and reference signal interact at the mobile and cause fluctuations in the instantaneous frequency, which are characterized in part by $f_{min}$ and $f_{max}$.
3. By observing the instantaneous frequency, the base can compute α using, for example, Eq.(52) or Eq.(53).
4. Knowing α, the base can determine ρ using a look up table of the curve embodied in FIG. 5.
5. The base, knowing ρ, modifies its transmit weight vectors according to the methods presented earlier.
6. Go to step 1.

This method, therefore, provides a practical way to use feedback in an adaptive antenna array system to minimize crosstalk. It can be implemented without modification to existing cellular phone handsets and without requiring burdensome feedback rates. Although the above description presents a particular method for implementing the method of the invention, it is intended only as an illustrative embodiment and is not intended to limit the scope of the invention. Instead, the scope should be determined by the following claims and their legal equivalents.

We claim:

1. A method for minimizing crosstalk in a wireless communications system comprising an array of transmitting elements and a set of receivers, the method comprising the steps of:

transmitting from the array to the receivers a set of transmitted signals chosen from the group consisting of a set of information signals and a set of probing signals, where the transmitting is in accordance with a set of initial weight vectors;

feeding back to the array a set of feedback signals, where each of the feedback signals is derived from the response at one of the receivers to the set of transmitted signals;

calculating from the set of feedback signals a set of new information weight vectors that minimize time-average crosstalk between the receivers and maximize time-average desired signal at each receiver; and transmitting the set of information signals from the array to the receivers in accordance with the set of new information weight vectors.

2. The method of claim 1, wherein the calculating step comprises determining a set of autocorrelation matrices from the set of feedback signals.

3. The method of claim 1, wherein the calculating step comprises:

estimating from the set of feedback signals a set of channel vectors, where each channel vector characterizes the signal gain from the array to one of the receivers; and calculating a set of autocorrelation matrices, where each autocorrelation matrix is formed by taking a linear combination of outer products of the channel vectors corresponding to one of the receivers.

4. The method of claim 1, wherein the calculating step comprises:

determining a set of diversity vectors; and forming each information weight vector from a linear combination of the diversity vectors, where the linear combination is determined by the set of feedback signals.

5. The method of claim 4 wherein the calculating step further comprises determining a set of autocorrelation matrices from the set of feedback signals and wherein each diversity vector has maximal projection onto one of the autocorrelation matrices and has minimal projection onto another autocorrelation matrix.

6. The method of claim 5, wherein each diversity vector is a dominant eigenvector of one of the autocorrelation matrices.

7. The method of claim 5, wherein each diversity vector is a dominant generalized eigenvector of a pair of matrices, where each matrix of the pair is formed from a linear combination of the autocorrelation matrices.

8. The method of claim 1, wherein the wireless communications system is compatible with the Advanced Mobile Phone System, and wherein the feeding back comprises measuring the instantaneous frequencies of the supervisory audio tones returned to the array by the receivers.

9. The method of claim 8, further comprising:

calculating a set of reference weight vectors for a set of reference signals; and transmitting the set of reference signals from the array to the receivers in accordance with the set of reference weight vectors.

10. The method of claim 9, wherein each reference signal is the product of one of the information signals and a signal with significant energy content between 5.8 kHz and 6.2 kHz.

* * * * *